US011110932B2

(12) United States Patent
Hummelshøj (10) Patent No.: US 11,110,932 B2
(45) Date of Patent: Sep. 7, 2021

(54) METHODS AND SYSTEMS FOR PREDICTING OBJECT ACTION

(71) Applicant: Toyota Research Institute, Inc., Los Altos, CA (US)

(72) Inventor: Jens Strabo Hummelshøj, Burlingame, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 188 days.

(21) Appl. No.: 15/803,171

(22) Filed: Nov. 3, 2017

(65) Prior Publication Data

US 2019/0135296 A1 May 9, 2019

(51) Int. Cl.
*B60W 40/09* (2012.01)
*G01C 21/32* (2006.01)
*G06K 9/00* (2006.01)
*G08G 1/01* (2006.01)
*G06N 7/00* (2006.01)

(52) U.S. Cl.
CPC .............. *B60W 40/09* (2013.01); *G01C 21/32* (2013.01); *G06K 9/00785* (2013.01); *G06K 9/00798* (2013.01); *G08G 1/0104* (2013.01); *B60W 2540/30* (2013.01); *G06N 7/005* (2013.01)

(58) Field of Classification Search
CPC .. B60W 40/09; B60W 2540/30; G06N 7/005; G08G 1/0104; G06K 9/00798; G06K 9/00785; G01C 21/32
See application file for complete search history.

(56) References Cited

U.S. PATENT DOCUMENTS

| | | | |
|---|---|---|---|
| 5,948,042 A | 9/1999 | Heimann et al. | |
| 9,299,023 B2* | 3/2016 | Wilson | G01C 21/32 |
| 9,420,559 B2 | 8/2016 | Bai et al. | |
| 2011/0087433 A1* | 4/2011 | Yester | G08G 1/163 |
| | | | 701/301 |
| 2012/0143488 A1* | 6/2012 | Othmezouri | G06K 9/00798 |
| | | | 701/301 |
| 2014/0372016 A1* | 12/2014 | Buchholz | G08G 1/161 |
| | | | 701/117 |
| 2016/0325753 A1* | 11/2016 | Stein | G06K 9/46 |
| 2017/0158175 A1* | 6/2017 | Fairfield | B60T 7/12 |
| 2017/0190334 A1 | 7/2017 | Zelman et al. | |
| 2017/0193384 A1 | 7/2017 | Mudalige et al. | |
| 2017/0200061 A1 | 7/2017 | Julian et al. | |

FOREIGN PATENT DOCUMENTS

EP 2387696 B1 5/2016

* cited by examiner

*Primary Examiner* — Mathew Franklin Gordon
(74) *Attorney, Agent, or Firm* — Christopher G. Darrow; Darrow Mustafa PC (57) ABSTRACT

Embodiments described herein disclose methods and systems for discrete mobile object monitoring. Using location and information from the recognition process, historical action information about a discrete mobile object, and associated object statistical information derived from the historical action information, a hypothesis can be generated for future actions and movements of the discrete mobile object. The information can then be stored for later hypothesis derivation, thus providing a more human-like understanding of the discrete mobile object, useful in a variety of automated tasks.

20 Claims, 4 Drawing Sheets

METHODS AND SYSTEMS FOR PREDICTING OBJECT ACTION

FIELD

The subject matter described herein generally relates to maneuver prediction and, more particularly, the determination of routine behaviors from a human driver in a particular environment.

BACKGROUND

In a modern vehicle, a human driver remains a component of the vehicle's control system, as the driver makes numerous decisions directed to the safe operation of the vehicle. Driver actions controlling speed, steering, obstacle and hazard recognition, and avoidance thereof are still are still the subject of constant improvement in autonomous vehicles. Autonomous vehicles, such as vehicles which do not require a human driver, can be used to aid in the transport of passengers or items from one location to another. One component of an autonomous vehicle system is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles can also use the cameras, sensors, and global positioning devices to gather and interpret images and sensor data about its surrounding environment, e.g., pedestrians, bicyclists, other vehicles, parked cars, trees, buildings, etc.

Human drivers are ever more frequently interacting with autonomous vehicles. Though autonomous vehicle prediction of other autonomous vehicles is generally known, human encounters include significantly more factors and are inherently less predictable. In recent years, devices and systems which determine and recognize human drivers or pedestrians in a field of view, and which direct autonomous vehicles in accordance with this judgment, have been proposed for the purpose of improving both quality of life and safety in autonomous navigation. These devices generally use object recognition and hypotheses regarding human behavior to make the above determinations and recognitions. However, the inherent difficulty in predicting individual driver action makes hypothesis-only systems subject to failure.

SUMMARY

The systems and methods described herein use historical data associated with an object and a location, to determine additional information associated with the object. In one embodiment, an object monitoring system for predicting object actions in an environment is disclosed. The object monitoring system can include one or more processors; and a memory communicably coupled to the one or more processors. The memory can include one or more modules. The memory system can include an object recognition module, including instructions that when executed by the one or more processors cause the one or more processors to obtain, using at least one image capture device, one or more images of a traffic environment, the image capture device having a fixed position within the traffic environment, and to monitor for a discrete mobile object in the traffic environment. The memory can further include an object action module, including instructions that when executed by the one or more processors cause the one or more processors to create current action information for the discrete mobile object, wherein the current action information comprises information about the pose and movement of the discrete mobile object in the traffic environment. The memory can further include an analysis module, including instructions that when executed by the one or more processors cause the one or more processors to predict a future action of the discrete mobile object using the current action information and historical action information, wherein the historical action information comprises current action information for the discrete mobile object in the traffic environment collected over time; and to control a vehicle in the traffic environment using the future action.

In another embodiment, a non-transitory computer-readable medium for predicting object actions in an environment is disclosed. The medium can store instructions that when executed by one or more processors cause the one or more processors to obtain, using at least one image capture device, one or more images of a traffic environment, the image capture device having a fixed position within the traffic environment. The medium can further store instructions that when executed by one or more processors cause the one or more processors to monitor for a discrete mobile object in the traffic environment. The medium can further store instructions that when executed by one or more processors cause the one or more processors to create current action information for the discrete mobile object, wherein the current action information comprises information about the pose and movement of the discrete mobile object in the traffic environment. The medium can further store instructions that when executed by one or more processors cause the one or more processors to predict a future action of the discrete mobile object using the current action information and historical action information, wherein the historical action information comprises current action information for the discrete mobile object in the traffic environment collected over time. The medium can further store instructions that when executed by one or more processors cause the one or more processors control a vehicle in the traffic environment using the future action.

In another embodiment, a method for discrete object monitoring is disclosed. The method can include obtaining, using at least one image capture device, one or more images of a traffic environment, the image capture device having a fixed position within the traffic environment. The method can further include monitoring for a discrete mobile object in the traffic environment. The method can further include creating current action information for the discrete mobile object, wherein the current action information comprises information about the pose and movement of the discrete mobile object in the traffic environment. The method can further include predicting a future action of the discrete mobile object using the current action information and historical action information, wherein the historical action information comprises current action information for the discrete mobile object in the traffic environment collected over time. The method can further include controlling a vehicle in the traffic environment using the future action.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Embodiments disclosed herein describe systems and methods for monitoring the behavior of discrete mobile objects, such as specific vehicles and pedestrian behaviors, in an environment. In one embodiment, an image capture device, such as a camera, is positioned at an intersection. The system can then use the image capture device to create a database of common vehicles, common pedestrians and behaviors of those vehicles and pedestrians that pass through the intersection. For example, on a daily commute, vehicles typically will execute the same maneuvers. Additionally, pedestrians will typically go on the same walks.

When a discrete mobile object (e.g., a known vehicle) enters an intersection (or where the discrete mobile object typically enters an intersection at a predicted time), the system can send gathered information to the surrounding vehicles, both autonomous and manned vehicles. In one example, a discrete mobile object can typically enter the intersection at 8:42 AM and execute a left turn. The system and methods described herein can gather this information of habits for each discrete mobile object and send the information to a database. In further embodiments, the information can be sent directly to the surrounding vehicles.

More, specifically, the object monitoring system can broadcast local history and statistics to a remote recipient (e.g., surrounding vehicles) using, for example, infrastructure-to-vehicle communications. Surrounding vehicles can include autonomous vehicles, other human driver vehicles or hybrid human driver/autonomous vehicles. In another example, the object monitoring system can send the local history and statistics to other types of remote recipients, such as a remote server, and the surrounding vehicles can retrieve the information or receive the information ahead of time prior to entering the intersection. As a result, a vehicle receiving the information does not have to analyze and hypothesize about every single object in the intersection.

The system or the remote recipient can identify likely maneuvers for the discrete mobile object. Using this information, an autonomous vehicles can plan its own maneuvers accordingly. In the case of human driver vehicles, this information can be used for behavior overlays, allowing the driver to see expected behavior of other drivers and pedestrians based on collected information. Hybrid vehicles can incorporate elements described for both human driver vehicles and autonomous vehicles, as can be beneficially employed based on the hybrid design. Elements of the embodiments disclosed herein are more clearly described with relation to the figures below.

Figure 1:
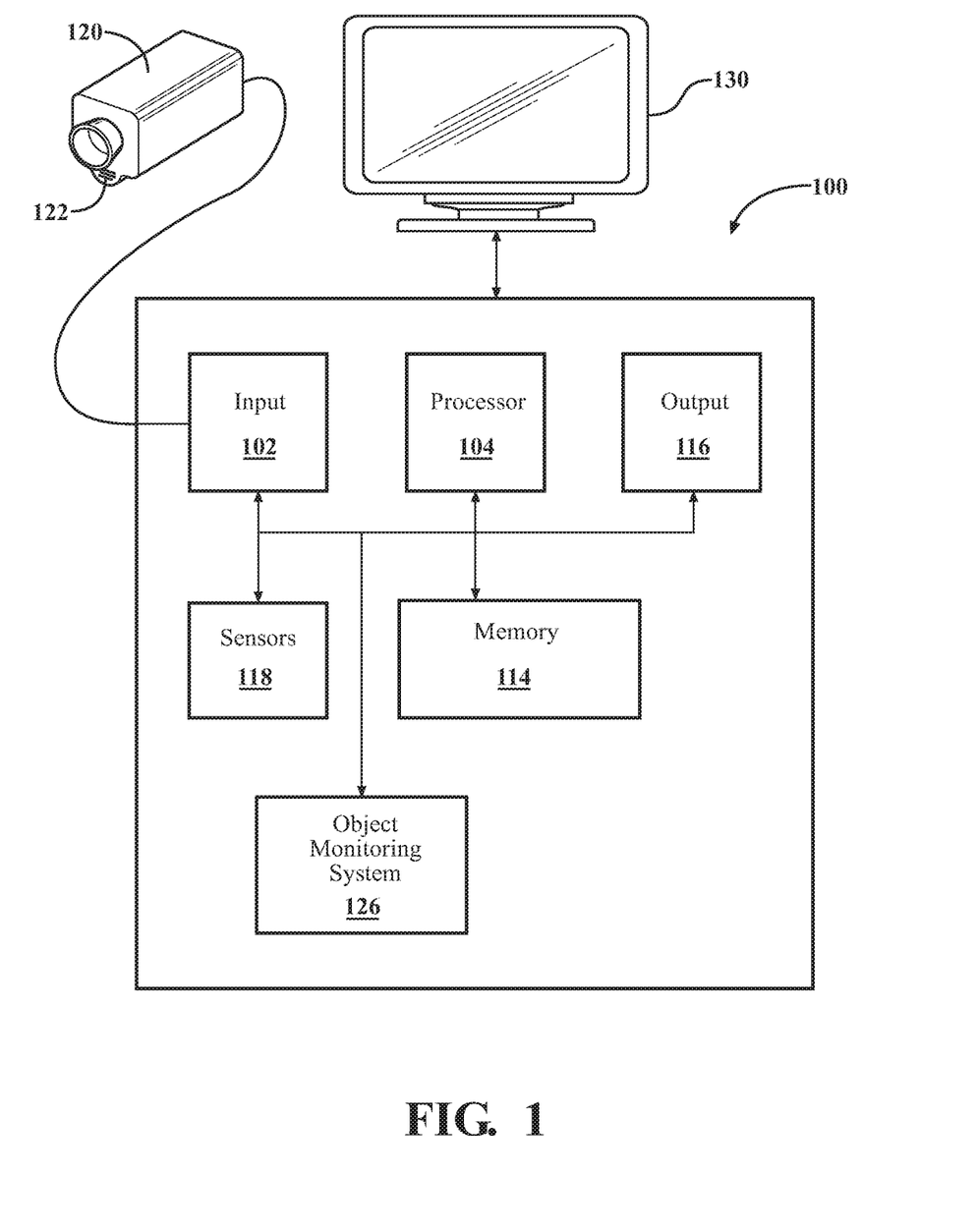
FIG. 1 is a block diagram of computing device and image capture device configured for determining future actions of a discrete mobile object based on historical actions, according to embodiments described herein.

Referring to FIG. 1, an example of a computing device 100 is illustrated. The computing device 100, as shown in FIG. 1, can be any appropriate type of computing device such as, but not limited to, a personal computer (PC), workstation, embedded computer, or stand-alone device with a computational unit, such as a microprocessor, DSP (digital signal processor), FPGA (field programmable gate array), or ASIC (application specific integrated circuit). Shown here, the computing device 100 is an embedded computer. While arrangements for computing devices 100 will be described herein with respect to an embedded computer, it will be understood that embodiments are not limited to embedded computers. In some embodiments, the computing device 100 can be any other form of computing device that, for example, can operate at least semi-autonomously, includes object detection or the capability to support object detection, and thus benefits from the functionality discussed herein.

The computing device 100 has an input 102 for obtaining images or data for analysis and final identification and/or verification. The input 102 is one or more connections, either wired or wireless, for an input device to the computing device 100. The input 102 can be of any suitable communication interface depending on device type and include, but is not limited to, USB (universal serial bus), frame grabber, Ethernet, or Firewire. The input 102 can be connected with sensors 118 (e.g., thermostat, barometer, etc.), microphones or other active or passive input devices or systems. Shown here, the input 102 is connected with the sensors 118, including an image capture device 120 and a microphone 122. The computing device 100 can still further comprise a connection 112. The connection 112, which can be wired or wireless, can allow the computing device 100 to communicate with other computing devices, locally or remotely, such as over a network protocol (e.g., Ethernet or similar protocols).

The computing device 100 further comprises a processor 104, such as a general purpose processor, for use in the data processing and analysis described herein. Depending on the desired configuration, the processor 104 can be of any type including but not limited to a microprocessor (μR), a microcontroller (μC), a digital signal processor (DSP), or any combination thereof. The processor 104 can be a set of one or more processors or can be a multi-processor core, depending on the particular implementation. Further, processor 104 can be one or more heterogeneous processor systems, in which a main processor is present with secondary processors on a single chip. In another example, the processor 104 can be a symmetric multi-processor system containing multiple processors of the same type. Further combinations or permutations of the processor 104 are contemplated without specific recitation herein.

The computing device 100 can further include memory 114. The memory 114 comprises one or more modules that include computer readable instructions that, when executed by the processor, cause the processor to perform methods and functions that are discussed herein. The memory 114 is any piece of hardware that is capable of storing information. The memory 114 can be stored as part of the computing device 100 or remote from the computing device 100. When the memory 114 is remote from the computing device 100, the memory is in communication with the computing device 100, such as through a wired or wireless protocol. Examples of information which can be stored in the memory 114 include, without limitation, data, program code in functional form, and/or other suitable information either on a temporary basis and/or a permanent basis. The memory 114 can be a random access memory, or any other suitable volatile or non-volatile storage medium. The memory 114 can take various forms, depending on the particular implementation. For example, memory 114 can contain one or more components or devices. For example, memory 114 can be a hard drive, a flash memory, a rewritable optical disk, a rewritable magnetic tape, or some combination of the above. The media used by memory 114 can be removable. For example, a removable hard drive can be used for memory 114. The memory 114 can contain information related to a reference material for comparison and/or analysis purposes, such as known prior actions of a discrete mobile object.

The computing device 100 can also include output connection 116 for conveying output in a fashion which is usable by an autonomous device or a user. In one example, the output connection 116 conveys output to a screen for convenient viewing (e.g., the display device 130) or to a control device for controlling an external process which the automobiles are part thereof. Embodiments of external processes can include, but are not limited to, autonomous vehicles or traffic control systems.

The computing device 100 further includes an object monitoring system 126 that is implemented to perform methods and other functions as disclosed herein relating to the accumulation of information regarding discrete mobile objects in the environment. Discrete mobile objects are specific people or vehicles which enter the environment, such as individual automobiles or pedestrians. The computing device 100 can also include an object recognition module for automated detection and recognition of an object, such as object recognition module 220, described with reference to FIG. 2 below. The object recognition module 220 can be in communication with or a part of the object monitoring system 126.

Figure 2:
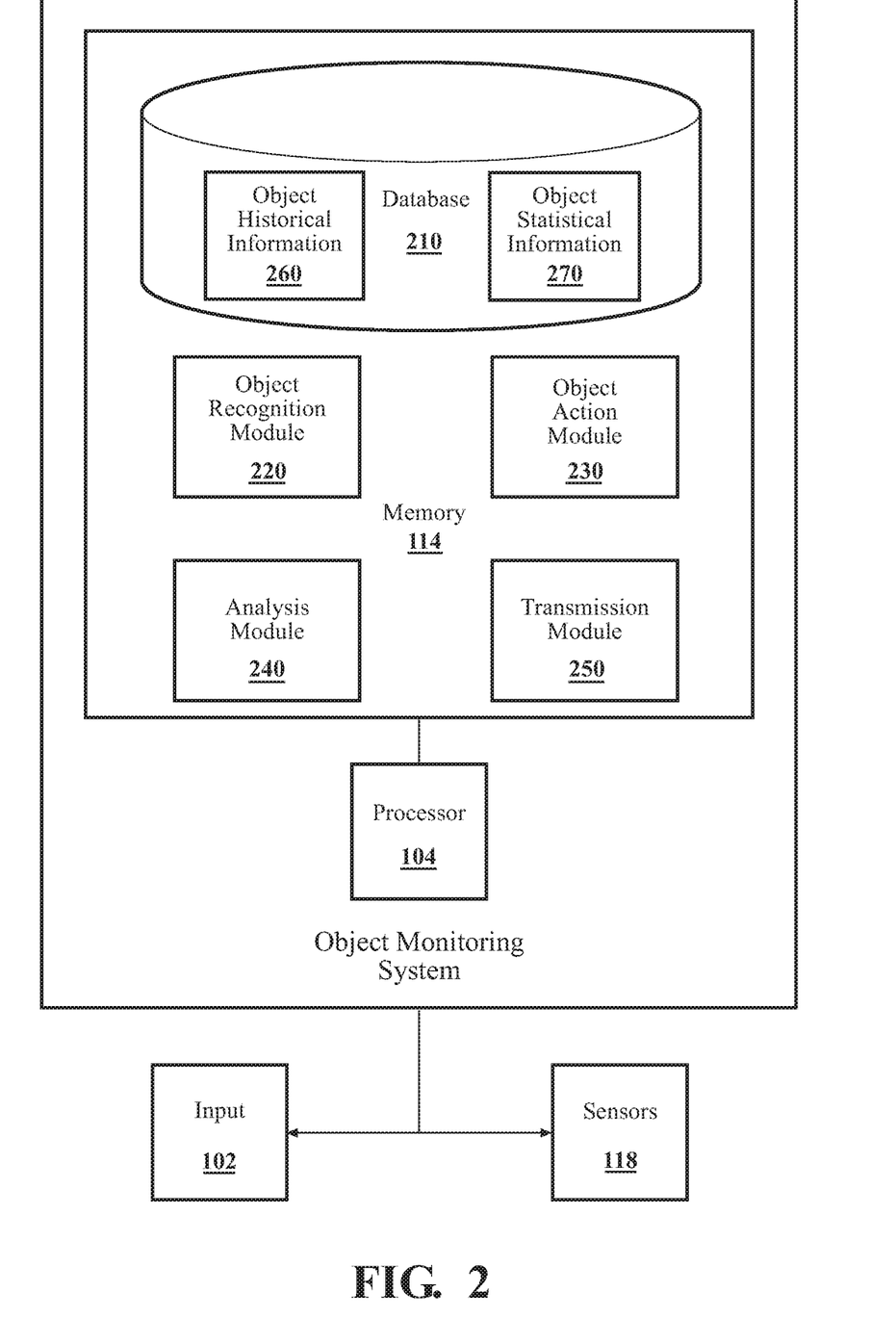
FIG. 2 is an illustration of an object monitoring system capable of tracking discrete mobile objects for behavior prediction, according to embodiments described herein.

With reference to FIG. 2, one embodiment of the object monitoring system 126 of FIG. 1 is further illustrated. The object monitoring system 126 is shown as including a processor 104 from the computing device 100 of FIG. 1. Accordingly, the processor 104 can be a part of the object monitoring system 126, the object monitoring system 126 can include a separate processor from the processor 104 of the computing device 100, or the object monitoring system 126 can access the processor 104 through a data bus or another communication path. In one embodiment, the object monitoring system 126 includes a memory 114 that stores an object recognition module 220, an object action module 230, an analysis module 240, and a transmission module 250. The memory 114 can be a part of the object monitoring system 126, the object monitoring system 126 can include a separate memory from the memory 114 of the computing device 100, or the object monitoring system 126 can access the memory 114 through a data bus or another communication path. The memory 114, as described in FIG. 1, can be a random-access memory (RAM), read-only memory (ROM), a hard-disk drive, a flash memory, or other suitable memory for storing the modules 220, 230, 240, and 250. The modules 220, 230, 240, and 250 are, for example, computer-readable instructions that when executed by the processor 104, cause the processor 104 to perform the various functions disclosed herein.

The object recognition module 220 can include instructions that function to control the processor 104 to perform automated detection and recognition of the discrete mobile object. Accordingly, the object recognition module 220 generally includes instructions that function to control the processor 104 to retrieve data from sensors 118 connected with an input 102 of the computing device 100. In one embodiment, the object recognition module 220 includes instructions to obtain, using at least one image capture device 120, one or more images of a traffic environment, the image capture device 120 having a fixed position within the traffic environment, such as mounted on a pole or a building. The object recognition module 220 can further include instructions which cause the processor 104 to process frame data collected from the image capture device 120 to detect patterns or shapes on the imaged objects, such as features specific to an automobile or a pedestrian. The output frames in which these patterns or markings were detected can then be flagged with the detected identifiers.

The object recognition module 220 can be configured to analyze the image of the traffic environment, to determine the details of the discrete mobile objects described above. The analysis can include instructions to monitor for a discrete mobile object in the traffic environment. In this way, the discrete mobile object can be uniquely identified and differentiated from other discrete mobile objects of the same class or type. This unique identification is converted to recognition data, which can be stored, processed or otherwise maintained. Optionally, the object recognition module 220 can be configured to instruct the processor 104 to accept commands from a user at the computing device 100 to perform a variety of functions. In one example, the object recognition module 220 can be commanded to analyze the captured image, including to display any portion of the environment and access an associated time and/or identities of discrete mobile objects for each frame.

Discrete mobile objects are objects that are mobile in the traffic environment and interact as part of traffic. "Discrete mobile objects" is understood in the sense of a recognition scheme. As such, the word "objects" includes living objects such as animals and people, as well as inanimate objects such as cars or trucks. Information about the discrete mobile objects can include any or all information described with reference to people and vehicles within the environment. The discrete mobile objects can further include frequently updated pose information, direction of motion information, and other motion related criteria, to reflect the changing nature of the discrete mobile objects.

Once a discrete mobile object is uniquely identified, the object can be associated with a unique identifier. The unique identifier can be preexisting, such as when the discrete mobile object has entered a traffic environment before, or the unique identified can be created in response to a new discrete mobile object in the traffic environment. The unique identifier can be stored in a non-personally identifying manner, such that privacy concerns are allayed. For example, all information regarding a certain automobile can be identified by a random number. If a discrete mobile object is detected that has already received a unique identifier, the discrete mobile object will then be associated to the correlated data from the historical action information 260. The historical action information 260 includes information previously collected about the discrete mobile object during other movements through the environment, such as a driver in a car following the same route to their destination.

Additionally, the object recognition module 220 can determine the relation of a discrete mobile object to existing data in the historical action information 260 in multiple different ways depending on a particular implementation. In one embodiment, the object recognition module 220 communicates with various input devices of the input 102 including one or more of: image capture device 120 (e.g., for detecting visible changes in discrete mobile objects), the sensors 118 (e.g., thermometers, infrared sensors, barometers, etc.), the microphone 122 (e.g., detecting squealing tires, horn sounds, etc.), and so on to produce input which can be used to recognize the distinct mobile object. In one embodiment, the input devices are located within the environment, remote from the computing device 100, and can be positioned in various locations in order to acquire information about the noted aspects of the discrete mobile object and/or aspects related to the environment. Furthermore, the object recognition module 220 can include multiple redundant input devices, connected through input 102, in order to, for example, improve accuracy/precision of collected historical action information 260 or to create redundancies in case of device failure.

The object action module 230 generally includes instructions that function to control the processor 104 to retrieve and create current action data regarding the discrete mobile object. Retrieving and preparing current action data can include collecting data from the sensors 118, as connected with an input 102 of the computing device 100, and collecting data from processing preexisting data, such as the recognition data. Current action data can include data that describes the position and orientation of the discrete mobile object in 3 dimensional space, commonly referred to as pose, and/or movements of a discrete mobile object, in the traffic environment. Current action data can include pose of the object, translational information, such as speed and direction of the discrete mobile object, acceleration, specific maneuvers (e.g., a turn), wheel position, and vehicle position in a lane, as related to the environment. Further, the object action module 230 can include instructions to acquire historical action information 260 from the database 210 that characterizes previously known information about a discrete mobile object, including location-based historical information about the discrete mobile object, and so on. It should be appreciated that the present disclosure provides an exemplary listing of aspects associated with the discrete mobile object that can be monitored to produce the current action data. The current action data can be added or compared to the historical action information 260. Further, the current action data can be used to modify existing historical action information 260. However, this listing is not to be construed as limiting and is provided as an exemplary list of possibilities for purposes of this discussion.

Accordingly, by way of example, the historical action information 260 can include information about object type and classification, number and timing of detections of the discrete mobile object, structural or body features, composition, ownership history, possession history, previous poses of the discrete mobile object, age, environment conditions, and so on. Further, the historical action information 260 can be a collection of information from a variety of sources. The variety of sources can include a data set about a discrete mobile object (i.e., the data collected, raw or processed, by the object recognition module 220, the object action module 230, the analysis module 240 and the transmission module 250 during the object monitoring process), a second historical action information from a second database (e.g., information gathered from another object monitoring system, similar to the one described here, for the same environment or a separate environment), or combinations thereof.

With continued reference to the object monitoring system 126, in one embodiment, the object monitoring system 126 can include the database 210. The database 210 can be stored in the memory 114. The database 210 is, in one embodiment, an electronic data structure stored in the memory 114 or another data store and that is configured with routines that can be executed by the processor 104 for analyzing stored data, providing stored data, organizing stored data, and so on. Thus, in one embodiment, the database 210 stores data used by the modules 220, 230, 240, and 250 in executing various functions. In one embodiment, the database 210 includes historical action information 260 collected by the object recognition module 220 and the object action module 230. In another embodiment, the database 210 can include further information created by the analysis module 240 using, in part, the historical action information 260, such as the object statistical information 270.

The analysis module 240, in one embodiment, generally includes instructions that function to control the processor 104 to predict a future action of the discrete mobile object using the current action information and historical action information. The future action can be predicted using statistical data regarding the discrete mobile object. The statistical data can be created by the analysis module 240. The statistical data is data which provides analysis of quantification regarding specific behaviors and actions of the discrete mobile object. The statistical data can be derived from the historical action information 260. Further, the analysis module 240 can use the historical action information 260 and contemporaneously collected data, such as environmental data, recognition data, and current action data (which are referred to herein as the discrete mobile object data set), to analyze the possible actions of the discrete mobile object in the environment. In general, the historical action information 260 is a collection of historical data, either observed by the object recognition module 220 or the object action module 230 (as part of the discrete mobile object data set) which are subsequently processed and added or collected from secondary sources, representing points of shared data between independent detections of the discrete mobile object in the environment. In one embodiment, the historical action information can include current action information for the discrete mobile object in the traffic environment collected over time. The statistical data can provide quantification of a variety of factors, including likelihood of a specific turn, given a known pose in the environment, indication of future action based on wheel position and orientation, likelihood of existing within the environment based on time frame, day, or other temporal criteria, likely speed, likely stopping distance, moving violations (both enforced and not), and other statistical data relevant to vehicles and pedestrians in a traffic environment.

Thus, by way of a brief example, the analysis module 240 can, for example, electronically access the historical action information 260 including information about the last known action from the current pose of the discrete mobile object in this environment. Using this information, the analysis module 240 assesses the information about last known pose of the discrete mobile object and, more particularly, information associating the last known pose of the discrete mobile object and traffic actions that followed (e.g., the discrete mobile object, the current pose, the number of directions available, and the number of times that the discrete mobile object has travelled in any one of them, etc.). From this information, the analysis module 240 can statistically characterize the likely future direction of the discrete mobile object and anticipated timing for movement within the environment. From here, the analysis module 240 uses the historical action information 260 and the discrete mobile object data set to determine statistical likelihoods about the discrete mobile object in the environment. Thus, the historical action information 260 informs the analysis module 240 about the discrete mobile object based on current and previous actions, as related to the environment.

In further aspects, the analysis module 240 can undertake a more complex analysis in order to consider multiple environmental interactions from the discrete mobile object. For example, the analysis module 240 can correlate a pose of the discrete mobile object in the environment with further information from the input 102 such as a presence/location of traffic obstacles within the environment, as detected by the object recognition module 220. Additionally, the analysis module 240 can further consider remote data when statistically analyzing the discrete mobile object in the environment. In one embodiment, the remote data can include various external structural aspects related to the discrete mobile object and external environmental aspects relating to the detected environment. For example, the remote data can include information from other object monitoring systems, GPS coordinates of the discrete mobile object, manufacturer parameters on the discrete mobile object (e.g., composition, weight, etc.), external events (e.g., expected time of arrival for the discrete mobile object changed due to a traffic accident), external temperature, movement route of the discrete mobile object based on previous detection, and other data collected by the object recognition module 220 from different sensors 118. In general, reference to the environment of the computing device 100 as used herein relates to information about the environment detected by the computing device 100, whether local or remote, objects in the environment, and association of the environment to the objects and vice versa.

Thus, to predict a likely future action from the discrete mobile object, the analysis module 240, in one embodiment, analyzes the historical action information 260 along with the additional information (e.g., the discrete mobile object data set) to determine statistical likelihood of taking a specific action (e.g., the discrete mobile object making a right hand turn from the right lane at an intersection). In general, the analysis module 240 identifies the various data elements in relation to the discrete mobile object, which provides, for example, likelihoods of discrete mobile object decision making. Subsequently, the analysis module 240 can combine the individual likelihoods according to defined weightings to produce an overall likelihood. Consequently, the analysis module 240 can provide the overall likelihood as the confidence level. The resulting statistical analysis can then be stored in the database as part of the object statistical information 270. The object statistical information 270 includes statistical data, derived from contemporaneous data and related historical action information 260, about a discrete dynamic object which has entered the environment.

The analysis module 240 can then control a vehicle in the traffic environment using the future action. The future action, as described above, is determination of the discrete mobile object performing one or more actions, based on previous actions. Using this information, a recipient vehicle can then receive instructions from the analysis module 240, regarding an appropriate response to the future action. In one example, the analysis module 240 makes a determination that a first vehicle (e.g., the discrete mobile object) will make a left hand turn at a first intersection. The analysis module 240 then communicates using infrastructure to vehicle communication with the recipient vehicle. The communication can include a set of instructions. In one embodiment, the instructions allow the recipient vehicle to avoid collision with the first vehicle and continue on the recipient vehicle's route, such as an indication displayed on a console display in the recipient vehicle. In another embodiment, the instructions control the recipient such that a collision is averted, such as instructions received at an autonomous control module for a semi-autonomous or fully autonomous recipient vehicle.

Additionally, while the use of many different sources and forms of data are described as being part of how the analysis module 240 computes the statistical information about the discrete mobile object, in various embodiments, the particular data can vary according to different aspects of the implementation. In any case, the present examples are intended for purposes of illustration and should not be construed as a limiting form of the disclosed data elements and functions. Moreover, it should be appreciated that the discussed historical action information 260 and additionally discussed electronic data can be, in one embodiment, collected and used to train the analysis module 240.

That is, the historical action information 260, recognition data, and other data can be collected and stored while the analysis module 240 is operating. Thereafter, the object monitoring system 126, in one embodiment, can communicate the collected information to central collection point, such as the database 210, to be used in revising the analysis module 240. In further embodiments, the object monitoring system 126 can use the collected information as a training data set to update or otherwise customize/improve the analysis module 240 or the object action module 230 in relation to independently confirmed positive hypotheses regarding of the discrete mobile object within the environment observed by the computing device 100. Thus, in one embodiment, the object monitoring system 126 further trains the analysis module 240 using the historical action information 260 and input 102 and by providing feedback to the analysis module 240 or the object action module 230 according to logged responses of a local operator and/or logged confirmed positive hypotheses computed by the analysis module 240. In this way, the object monitoring system 126 can actively learn which hypotheses correctly reflect actual events and thus, adjust the modules accordingly.

Optionally, the object monitoring system 126 can include a transmission module 250. The transmission module 250 can include instructions that function to control the processor 104 to transmit the historical action information 260 and/or the object statistical information 270 to a remote recipient. The transmission can be communicated from a computing device 100 to remote recipient through a variety of connections (either wired or wireless). Exemplary connections include Wi-Fi (any wireless protocol), Bluetooth, and Ethernet cable. The historical action information and the object statistical information can be transmitted on request from the remote recipient, by initialized upload from computing device 100 or by constant feed from the computing device 100. The object statistical information 270 can include the previously described statistical analysis of previous actions from the discrete mobile object. The object statistical information 270 can optionally further include hypotheses regarding future actions.

The remote recipient can be a local computing device, whether connected to a vehicle or not, which receives the historical action information 260 and the object statistical information 270. The remote recipient can include the user or operator of the local computing device. The term "remote", as used in this embodiment, is intended to indicate any recipient outside of the computing device 100, and is not intended to be a measure of proximity to the computing device 100, the image capture device 120, or the object monitoring system 126. Exemplary embodiments of the remote recipient include an on-board computer in an automobile, the computing system of an autonomous automobile, a smart phone, or a laptop.

The historical action information 260 and the object statistical information 270 can be processed and/or utilized by the remote recipient to perform a specific task (e.g., avoid a collision, drive a vehicle, etc.). In embodiments where the object statistical information 270 includes hypotheses regarding future actions, the local computing device can apply the hypothesis to the situation of the remote device (e.g., with consideration of direction, location, movement speed, etc.) and determine an action for the remote recipient (e.g., wait for the discrete mobile object to pass). In embodiments, where the object statistical information 270 does not provide hypothesis, the remote recipient can formulate hypothesis based on the information as received or including information specific to the remote recipient. In one example, the remote recipient is an autonomous vehicle which receives the historical action information 260 and the object statistical information 270 without hypothesis. The autonomous vehicle then processes the information received from the object monitoring system 126 with information derived from the autonomous vehicle, which can include current trajectory, position on the road, speed and other factors. Using said information, the autonomous vehicle can then create a hypothesis regarding the expected behavior of the discrete mobile object. Other and further combinations will be understood by one skilled in the art without specific recitation herein.

Figure 3:
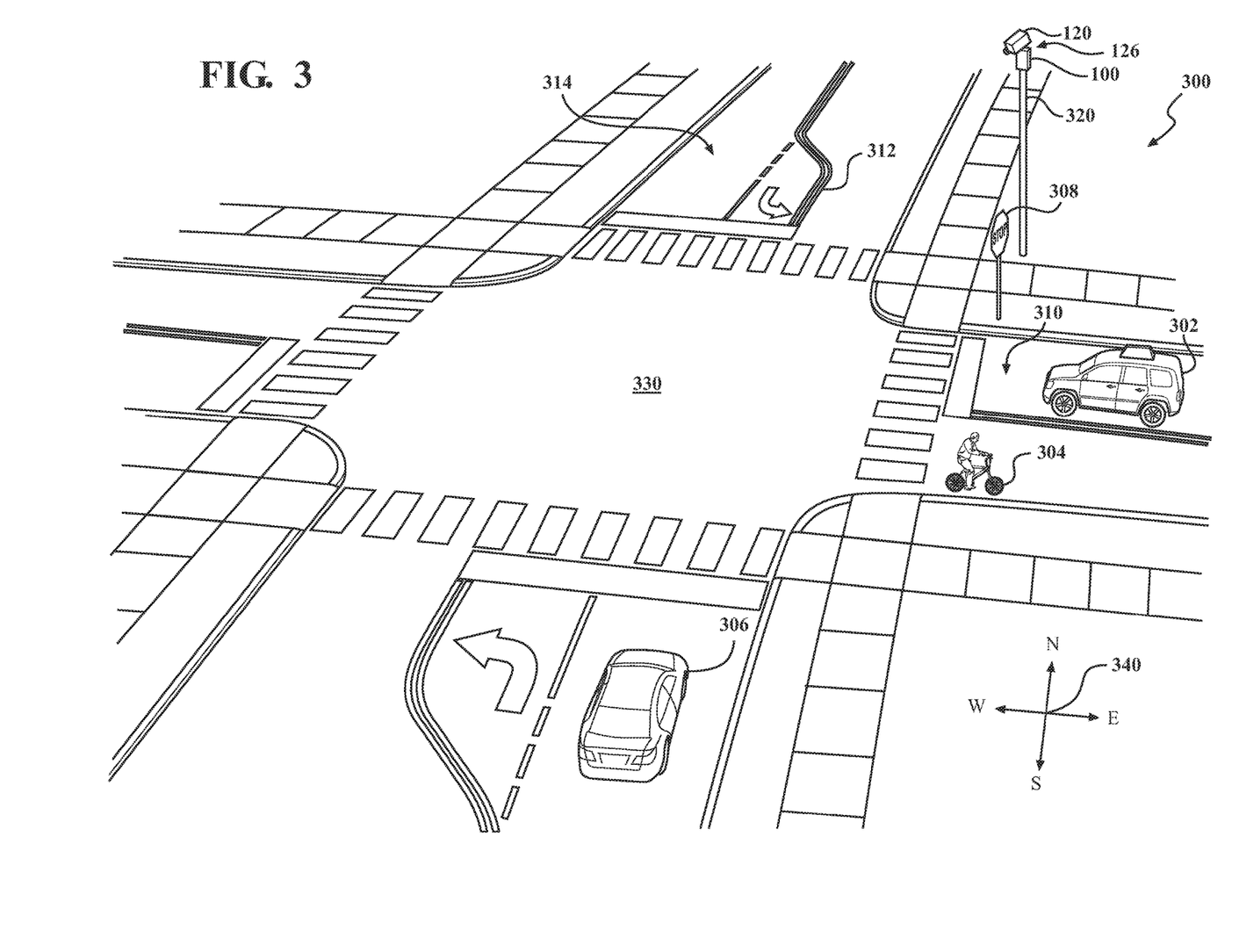
FIG. 3 is an illustration of an object monitoring system implemented in a traffic environment, according to one embodiment.

FIG. 3 depicts the object monitoring system as used in an environment 300, according to one embodiment. The object monitoring system 126 can include the elements described above with reference to FIGS. 1 and 2. The object monitoring system 126 is used as part of the environment 300 for obtaining images, analyzing discrete mobile objects and forming hypotheses regarding future behaviors from the discrete mobile objects. As such, the object monitoring system 126 can include the image capture device 120 or any other device or unit for obtaining a representation of or information about the discrete mobile objects, and the computing device 100 having modules of the object monitoring system 126 stored therein, as described above. The discrete mobile objects 302, 304, 306 can include a first automobile, a bicycle, and a second automobile, respectively.

The object monitoring system 126, as part of the computing device 100 and the image capture device 120, is shown as positioned on a tower 320. The tower 320 can be a cylindrical column, as shown. The tower 320 provides for height and stability, such that the object monitoring system 126 can view the entirety of the environment 300 with minimal obstruction. In embodiments described herein, the object monitoring system 126 can have one or more image capture devices, such as described with reference to the image capture device 120. The one or more image capture devices can have a fixed position in the environment 300. The one or more image capture devices can be separately position, such that each image capture device is in a fixed position at a different location in the environment.

The environment 300, depicted here, is a traffic environment. "Traffic environment", as used herein, refers to an environment which is substantially dedicated to vehicle traffic, such as pedestrian or automobile road traffic. Examples of traffic environments includes intersections, freeways, neighborhood streets, parking lots, dedicated bike paths, bridges, vehicle tunnels or other locations which have a substantial use in vehicle traffic. Shown here, the environment 300 has a first road 310 intersecting with a second road 314. Traffic in the environment 300 is primarily controlled by a series of stop signs 308 and road surface markings 312. Road surface markings 312 can include lines separating traffic and arrows indicating the proper lanes for turns.

In one embodiment, the object monitoring system 126 can include instructions for the object recognition module 220, the object action module 230, the analysis module 240 the transmission module 250, or combinations thereof. In one embodiment, the object monitoring system 126, as implemented with a computing device 100 and an image capture device 120, contains instructions for modules 220, 230, 240 and 250. Below, we discuss the interaction between the system and the environment, with reference to an example.

Shown here, the object recognition module 220 of the object monitoring system 126 is being executed by the processor 104 of the computing device 100, causing the processor 104 to receive environmental data from the image capture device 120 to monitor the environment 300. The object monitoring system 126, through execution by the computing device 100, detects numerous components of the environment 300, including the first road 310, the second road 314, the stop sign 308, the road surface markings 312 (including arrows, crosswalks, and lane indicators), the intersection 330, the discrete mobile object 302, the discrete mobile object 304 and the discrete mobile object 306. Objects such as the first road 310, the second road 314, the stop sign 308, the road surface markings 312 (including arrows, crosswalks, and lane indicators), and the intersection 330 can be referred to as stationary objects, as their pose in the environment does not substantially change. The object monitoring module 220 can further include instructions to differentiate between stationary objects and mobile objects. The environmental data, collected by the object recognition module 220, can further include seasonal data, weather data or other atmospheric data.

The object recognition module 220, through execution by the computing device 100, then examines the discrete mobile objects for recognition data. In this embodiment, the object recognition module 220 determines, using shape, size, and specific indicators, such as the dual stripe on the roof that the discrete mobile object 302 corresponds to "identifier no. 31423", an arbitrary assigned numerical indicator given to the discrete mobile object 302 when it was initially detected by the object monitoring system 126. The indicator is described as numerical here, however numbers, letters, characters, chevrons or any other form of unique symbolic identifier can be used in one or more embodiments described herein.

The object recognition module 220, through execution by the computing device 100, further detects the discrete mobile object 304 and the discrete mobile object 306. In this example, each of the discrete mobile object 304 and the discrete mobile object 306 are assigned a new numerical indicator, as this is the first detection of these objects. The object recognition module 220 then collects distinct indicators specific to the discrete mobile object 304 and the discrete mobile object 306. The distinct indicators can be any detectable indicia or combination thereof about the discrete mobile object, including shapes, sizes, paint colors, sounds produced, visible indicators (e.g., body damage), specific markings (e.g., a stripe), absorbance at specific wavelengths, or others. The distinct indicators, the numerical indicators, temporal information, object class and type, and other information is then collected as recognition data. At least a copy of the environmental data and the recognition data is then stored in the historical action information 260 in the database 210

After receiving the recognition data and determining previous entry into the environment 300, the object action module 230 of the object monitoring system 126 is executed by the processor 104 of the computing device 100, causing the processor 104 to receive data from the image capture device 120 to determine position data, orientation data and action data for the discrete mobile objects 302, 304, and 306. The object action module 230 can include instructions to create a coordinate map from the field of view of the image capture device 120. The position data can include assignment to a specific location on the coordinate map. As the objects are mobile, assignment on the coordinate map can include changes in position over time, relative GPS coordinates and other information. Orientation data is related to the standard direction of motion for the discrete mobile object. Focusing on discrete mobile object 302, the standard direction of motion is the direction away from the front end of the vehicle. As such, orientation of the discrete mobile object 302 is related to the direction the front end of the vehicle is facing, which is west as determined from compass rose 340. Action data is data related to actions taken by the discrete mobile objects during the period of time in the environment. Action data can be determined by displacement of the vehicle, position of the wheels, abnormal movements (e.g., sliding on ice), audible data (e.g., collisions), or other indicators of movement, either accidental or controlled. Using the discrete mobile object 302 as an example, the vehicle is approaching a stop sign from the east, moving west in a straight line (indicating that the driver is in control of the vehicle). At a second point in time, moving forward in the future, the discrete mobile object 302 is stopped at a stop sign, with wheels turned such that the vehicle will move north (indicating a right turn). Each of the discrete mobile object 304 and the discrete mobile object 306 are then analyzed, either sequentially, randomly or simultaneously, for position data, orientation data and action data as described above. This data is then accumulated to create current action information. At least a copy of the current action information is then stored in the historical action information 260 in the database 210

The analysis module 240 of the object monitoring system 126 can then be executed by the processor 104 of the computing device 100, causing the processor 104 to receive data from the image capture device 120, analyze the historical action information 270, and to create object statistical information 270 about the discrete mobile object. The object statistical information 270 is the result of statistical processing of the various data points. The object statistical information 270 can be considered for each of the discrete mobile objects 302, 304, and 306. The object statistical information 260 can include statistical analysis of speed, acceleration, braking distance, likelihood of taking a specific traffic option (e.g., going straight vs. taking a right turn), handling inclement weather, handling in the presence of other traffic issues, and other factors related to the interaction of the discrete mobile object and the environment 300. In one example, the accumulated number of times that the discrete mobile object 302 is used to determine that, at specific times of the day, discrete mobile object 302 makes a right turn, when approaching intersection 330 from the east on the first road 310, 78% of the time. The object statistical information 270 is then accumulated or stored in a database, such as database 210.

Using the historical action information 260 and the object statistical information 270, the analysis module 240 can then predict a future action for the discrete mobile objects 302, 304 and 306. The future action can be determined by the object monitoring system 126 using the historical action information 260 and the object statistical information 270, such as that discrete mobile object 302 will make a right hand turn before discrete mobile object 306 crosses the intersection 330. The communication from the analysis module 240 can be an infrastructure to vehicle transmission. Shown here, the discrete mobile object 306, an autonomous vehicle, receives instructions from the analysis module 240. The instructions control the discrete mobile object 302 to avoid any possible collision with the discrete mobile objects 304 and 306.

Optionally, the transmission module 250 of the object monitoring system 126 can then be executed by the processor 104 of the computing device 100, causing the processor 104 to transmit the historical action information 260 and the object statistical information 270 to a remote recipient. As discrete mobile object 306 approaches the intersection, discrete mobile object 302 makes a request from the computing device 100. Instructions from the transmission module 250 cause the processor 104 to receive the request and upload the historical action information 260 and the object statistical information 270 to the discrete mobile object 302 through a remote recipient. The discrete mobile object 302 can then analyze the historical action information 260 and the object statistical information 270, in light of data collected by internal systems of the discrete mobile object 306. The discrete mobile object 302 can then make a hypothesis about the future action of discrete mobile object 306 (e.g., that discrete mobile object 306 will make a right hand turn before discrete mobile object 302 crosses the intersection 330). In this example, the discrete mobile object 302 receives the historical action information 260 and the object statistical information 270 from the transmission module 250, forms a hypothesis about the future action of the discrete mobile object 306, and changes course and makes a left hand turn at the intersection 330.

Figure 4:
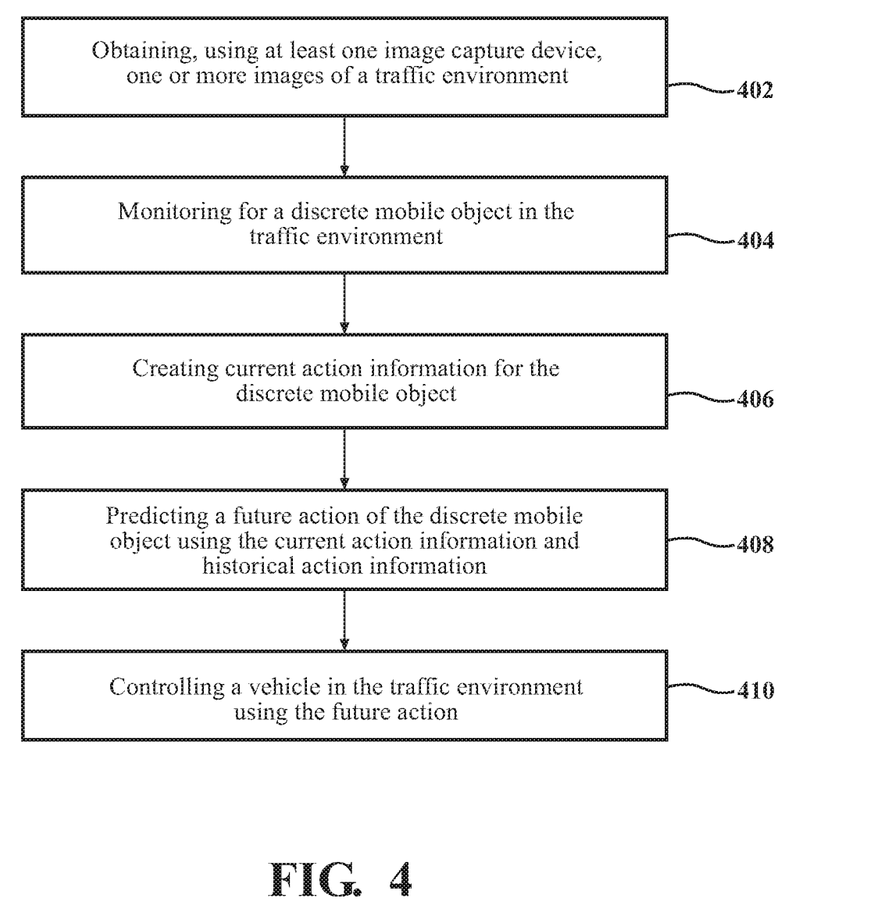
FIG. 4 is a flow diagram of a method for discrete mobile object monitoring, according to embodiments described herein.

FIG. 4 depicts a method 400 for detecting the historical movements of a discrete mobile object within an environment. Upon entering the environment, the discrete mobile object is recognized and associated with related historical action information particular to the discrete mobile object. Further data about the discrete mobile object can be collected and incorporated into the historical action information. Then, the historical action information is processed to create statistical data. In this way, statistical data can be employed either locally or remotely for future behavior predictions for the discrete mobile object. The method 400 can include obtaining, using at least one image capture device, one or more images of a traffic environment, at 402. The traffic environment can then be monitored for a discrete mobile object, at 404. Current action information can then be created for the discrete mobile object, at 406. Then, a future action of the discrete mobile object can be predicted using the current action information and historical action information, at 408. Finally, a vehicle can be controlled in the traffic environment using the future action, at 410

The method 400 can begin by obtaining, using at least one image capture device, one or more images of a traffic environment, at 402. The obtaining can include collecting environmental data and recognition data using at least one image capture device, the environmental data and the recognition data being added to a database of historical action information. In one embodiment, the obtaining of one or more images of a traffic environment, is performed as part of a system, such as the object monitoring system 126. As previously stated, the object recognition module 220 of the object monitoring system 126 can be executed by the processor 104 of the computing device 100, causing the processor 104 to receive one or more images from the image capture device 120. The method 400 can use previously acquired environmental data from the historical action information 260 for the environment or the environmental data can be acquired during the monitoring. The environment is defined as the area covered by the field of detection for the sensors, such as the field of view for an image capture device. As the image capture device has a fixed position within the traffic environment, the field of view can be determined by the detection limits of the image capture device.

The field of detection includes detectable aspects of stationary objects and discrete mobile objects. The field of detection includes visibility restricted static and discrete mobile objects, objects, such as obstructed objects, partially obstructed objects, reasonably anticipated objects (e.g., two walls appear to be converging, so a corner is a reasonably anticipated object even if outside of the field of view), audible characteristics of the discrete mobile object and others. In one example, the environment can be an intersection, as depicted in FIG. 3. The environmental data from this environment can be gathered as part of the method 400 (e.g., collecting the information about the environment when the method 400 is implemented), or it can be produced/collected prior to implementing the method 400. The environmental data contains numerous pieces of information regarding the stationary objects in the environment, atmospheric information, discrete mobile objects which have entered the environment and other environmental concerns.

As described above, the environmental data from the traffic environment can include stationary objects. Stationary objects are objects occur with regular frequency in the environment and not associated with traffic in the environment. The information about the stationary objects can include structural and positioning information, such as the pose (i.e., the position and orientation) of the object, length of time in the environment, date of arrival, and other origination information about the object. In one example, the environment is an intersection and the stationary objects include a picture stop sign, a sidewalk, a building, a tree and two intersecting roads. The information about the stationary objects can further include object type information, such general use, traffic implications (e.g., all vehicles approaching a stop sign must stop), time frames (e.g., no parking during specific times) and other traffic related information about the object.

The traffic environment can then be monitored for a discrete mobile object, at 404. Once detected in the environmental data, the discrete mobile object can then be recognized, such as through an object recognition system. As the discrete mobile object enters the environment, the discrete mobile object can be detected using object recognition, creating recognition data about the discrete mobile object, as described above. In one embodiment, the traffic environment is monitored as part of a system, such as the object monitoring system 126. As previously stated, the object recognition module 220 of the object monitoring system 126 can be executed by the processor 104 of the computing device 100, causing the processor 104 to monitor the one or more images for a discrete mobile object. This recognition data and the related environmental data, can then be added to the historical action information. The discrete mobile object can be detected as part of a system, such as the object monitoring system 126, described with reference to FIGS. 1 and 2.

Current action information can then be created for the discrete mobile object, at 406. The current action information includes information about the pose and movement of the discrete mobile object in the traffic environment. The pose and movement information about the discrete mobile object can be collected in the form of position data, orientation data and action data. Position data, orientation data, and action data can be substantially similar to the descriptions with reference to FIG. 1-3. The position data, orientation data and action data can be acquired by an object monitoring system, such as the object monitoring system 126 described with reference to FIGS. 1-3. The position data, orientation data and action data can be determined based on visible indicators, such as location in the environment, position of the wheels, change in position over time, speed and acceleration as calculated from translation of the discrete mobile object in a plurality of images. The position data, orientation data and action data is the combined to create current action information. The current action information can be created using a system, such as the object monitoring system 126. The object action module 230 can includes instructions that function to control the processor 104 to create current action data regarding the discrete mobile object. The current action information can then be indexed and added to the historical action information.

The pose as used herein, described in the sense of six degrees of freedom, involves the position and orientation of the discrete mobile object with respect to the traffic environment. Pose is measurement of the discrete mobile object both regarding position on the three (3) dimensional plane (X, Y, and Z-axes) and rotational position as compared to normal on each of those axes. The movement, as used herein, in light of six degrees of freedom includes both translation and rotation in relation to a three-dimensional plane. Described with reference to a single object having a known starting position and direction, movement backwards and forwards (referred to as "surge"), left or right (referred to as "sway"), and up or down (referred to as "heave"), corresponds to movement on Z, X and Y planes respectively. Yaw is rotation about the Y plane. Pitch is rotation about the X plane. Roll is rotation about the Z plane.

Then, a future action of the discrete mobile object can then be predicted using the current action information and historical action information, at 408. Historical action information related to the discrete mobile object can then be analyzed. The historical action information can include a compilation of previously acquired current action information regarding the discrete mobile object in the traffic environment, collected over time. If the discrete mobile object has been in an environment before, the previously gained information regarding the discrete mobile object will be used to create statistical measures. Historical action information can include previous entries into the environment, previous traffic actions in the environment, previous poses in this or other environments, and behaviors in light of other discrete mobile objects and stationary objects. The historical action information can then be statistically analyzed to create object statistical information. The object statistical information, as described above, is analysis of various numerical measures which provide useful information about previous behavior from the discrete mobile object, such as the number of times and in what circumstances has the discrete mobile object turned rather than driving across as specific intersection. The future action is a prediction of an expected action in a specific period of time regarding the discrete mobile object. The future action can be a future action as described with reference to FIG. 2. Specifically, the future action can be predicted using the current action information and historical action information through a system, such as the object monitoring system 126, described with reference to FIG. 2. As described above, the analysis module 240 can include instructions that function to control the processor 104 to predict the future action of the discrete mobile object using the current action information and historical action information. The specific period of time can be related to the time frame that the action would take to perform from an initial time zero. The future action and the time frame can be related to information known about the vehicle collected in the environment.

When dealing with data regarding people, privacy is an issue to consider. As such, the method can further include obfuscating personally identifiable information. If information is collected that would make it possible for someone viewing the information to determine the exact person the information relates to, that information will be reduced such that it is no longer personally identifiable. For example, a person is associated with a car where the license plate is known. In this case, important associations can be collected in the association data and then the license plate can then be converted to an internally recognizable number.

Then, a vehicle can be controlled in the traffic environment using the future action, at 410. In this case, the future action, instructions related to the future actions or combinations thereof, can then be forwarded to the recipient vehicle. In the case of an autonomous or semi-autonomous recipient vehicle, the future action can be encoded in the form of instructions, such that the recipient vehicle performs an action or maneuver in response to the future action. In the case of all vehicles, the future action can be forwarded such that the maneuver is predicted on a display for the driver. The displayed prediction can then be acted upon by the driver, according to his or her expertise. In a further embodiment, the future action can be received by the vehicle and incorporated to create instructions, such that the recipient vehicle performs an action or maneuver in response to the future action. One skilled in the art will understand that various combinations available for future actions and instructions, based on the disclosure here. In further embodiments, the future action can be used to control a vehicle through a system, such as the object monitoring system 126, described with reference to FIG. 2. As described above, the analysis module 240 can include instructions that function to control the processor 104 to control the vehicle in the traffic environment using the future action. Further combinations of future action and instructions are specifically contemplated without further recitation herein.

Optionally, the method 400 can further include communicating the historical action information and the object statistical information to a remote recipient at 412. The remote recipient can be substantially similar to the remote recipient described above, with reference to FIG. 2. The historical action information and the object statistical information can be communicated from a computing device to an autonomous robot through a variety of connections (either wired or wireless). Exemplary connections include Wi-Fi (any wireless protocol), Bluetooth, and Ethernet cable. In another embodiment, the communication can be performed using a system, such as the object monitoring system 126, described with reference to FIG. 2. As described previously, the transmission module 250 of the object monitoring system 126 can be executed by the processor 104 of the computing device 100, causing the processor 104 to transmit the historical action information 260 and the object statistical information 270 to the remote recipient. The historical action information and the object statistical information can be transmitted on request from the remote recipient, by initialized upload from computing device or by constant feed from the computing device. The historical action information and the object statistical information can then be processed and/or utilized by the remote recipient to perform a specific task (e.g., hypothesis formation regarding a future action about discrete mobile objects).

Other and further embodiments of the system and methods described above are contemplated, including combinations of or deletions from said methods, without specific recitation thereof. In a further embodiment, the object monitoring system includes a transmission module including instructions that when executed by the one or more processors cause the one or more processors to transmit the historical action information and the object statistical information to a remote recipient. In another embodiment, the remote recipient uses the historical action information and the statistical information to predict a future action of the discrete mobile object. In another embodiment, the remote recipient is a remote database or a vehicle proximate to the discrete mobile object. In another embodiment, the analysis module further comprises instructions to use the historical action information and the object statistical information to predict a future action of the discrete mobile object. In another embodiment, the transmission module includes instructions that when executed by the one or more processors cause the one or more processors to transmit the prediction of a future action to a remote recipient. In another embodiment, the analysis module further comprises instructions to use historical action information as part of training the analysis module. In another embodiment, the object recognition module further includes instructions to collect environmental data using one or more sensors. In another embodiment, the current action information includes information regarding possible range of motion for the discrete mobile object.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. An object monitoring system for predicting object actions in an environment, comprising:
   one or more processors; and
   a memory communicably coupled to the one or more processors and storing instructions that when executed by the one or more processors cause the one or more processors to:
   obtain, using at least one image capture device having a fixed position within a traffic environment, one or more images of the traffic environment;
   monitor for a discrete mobile object in the traffic environment, the monitoring including analyzing the one or more images of the traffic environment to detect the discrete mobile object;
   uniquely identify the discrete mobile object by analyzing the one or more images of the traffic environment to detect patterns or markings of the discrete mobile object, whereby the discrete mobile object can be differentiated from other discrete mobile objects of the same class or type;
   create current action information for the discrete mobile object, wherein the current action information comprises information about pose and movement of the discrete mobile object during its current movement through the traffic environment;
   predict a future action of the discrete mobile object using the current action information and historical action information, wherein the historical action information comprises previously acquired information about the discrete mobile object during previous movements through the traffic environment collected over time, wherein the historical action information does not include the current action information, the historical action information being at least partially acquired from one or more databases of historical action information, the discrete mobile object being a single object, the current action information and the historical action information being for the single object; and
   remotely control a vehicle in the traffic environment using the future action, whereby the one or more processors and the memory are located remote from the vehicle.

2. The object monitoring system of claim 1, wherein the future action is predicted using object statistical information.

3. The object monitoring system of claim 2, wherein the object statistical information includes confidence intervals for one or more possible actions, the future action being selected from the one or more possible actions.

4. The object monitoring system of claim 2, wherein the memory further includes instructions that when executed by the one or more processors cause the one or more processors to:
transmit the historical action information and the object statistical information to a remote recipient.

5. The object monitoring system of claim 4, wherein the remote recipient is a remote database.

6. The object monitoring system of claim 1, wherein the current action information comprises position data, orientation data and action data about the discrete mobile object.

7. The object monitoring system of claim 1, wherein the one or more image capture devices comprises two or more image capture devices, each of which having a separate fixed position within the environment.

8. The object monitoring system of claim 1, wherein the current action information includes information regarding range of motion for the discrete mobile object.

9. A non-transitory computer-readable medium for predicting object actions in an environment and storing instructions that, when executed by one or more processors cause the one or more processors to:
obtain, using at least one image capture device having a fixed position within a traffic environment, one or more images of the traffic environment;
monitor for a discrete mobile object in the traffic environment, the monitoring including analyzing the one or more images of the traffic environment;
uniquely identify the discrete mobile object by analyzing the one or more images of the traffic environment to detect patterns or markings of the discrete mobile object, whereby the discrete mobile object can be differentiated from other discrete mobile objects of the same class or type;
create current action information for the discrete mobile object, wherein the current action information comprises information about pose and movement of the discrete mobile object during its current movement through the traffic environment; and
predict a future action of the discrete mobile object using the current action information and historical action information, wherein the historical action information comprises previously acquired information about the discrete mobile object during previous movements through the traffic environment collected over time, wherein the historical action information does not include the current action information, the historical action information being at least partially acquired from one or more databases of historical action information, the discrete mobile object being a single object, the current action information and the historical action information being for the single object; and
remotely control a vehicle in the traffic environment using the future action.

10. The non-transitory computer-readable medium of claim 9, wherein the future action is predicted using object statistical information.

11. The non-transitory computer-readable medium of claim 10, wherein the object statistical information includes confidence intervals for one or more possible actions, the future action being selected from the one or more possible actions.

12. The non-transitory computer-readable medium of claim 10, further including instructions that when executed by the one or more processors cause the one or more processors to transmit the historical action information and the object statistical information to a remote recipient.

13. The non-transitory computer-readable medium of claim 12, wherein the remote recipient is a remote database.

14. The non-transitory computer-readable medium of claim 9, wherein the current action information comprises position data, orientation data and action data about the discrete mobile object.

15. The non-transitory computer-readable medium of claim 9, wherein the one or more image capture devices comprises two or more image capture devices, each of which having a separate fixed position within the environment.

16. The non-transitory computer-readable medium of claim 9, wherein the current action information includes information regarding range of motion for the discrete mobile object.

17. A method for predicting object actions in an environment, comprising:
obtaining, using at least one image capture device having a fixed position within a traffic environment, one or more images of the traffic environment;
monitoring for a discrete mobile object in the traffic environment, the monitoring including analyzing the one or more images of the traffic environment;
uniquely identifying the discrete mobile object by analyzing the one or more images of the traffic environment to detect patterns or markings of the discrete mobile object, whereby the discrete mobile object can be differentiated from other discrete mobile objects of the same class or type;
creating current action information for the discrete mobile object, wherein the current action information comprises information about pose and movement of the discrete mobile object during its current movement through the traffic environment;
predicting a future action of the discrete mobile object using the current action information and historical action information, wherein the historical action information comprises previously acquired information about the discrete mobile object during previous movements through the traffic environment collected over time, wherein the historical action information does not include the current action information, the historical action information being at least partially acquired from one or more databases of historical action information, the discrete mobile object being a single object, the current action information and the historical action information being for the single object; and
remotely controlling a vehicle in the traffic environment using the future action.

18. The method of claim 17, wherein the future action is predicted using object statistical information.

19. The method of claim 18, transmitting the historical action information and the object statistical information to a remote recipient.

20. The method of claim 17, wherein the current action information comprises position data, orientation data and action data about the discrete mobile object.

* * * * *

UNITED STATES PATENT AND TRADEMARK OFFICE
CERTIFICATE OF CORRECTION

PATENT NO.         : 11,110,932 B2
APPLICATION NO.    : 15/803171
DATED              : September 7, 2021
INVENTOR(S)        : Jens Strabo Hummelshøj

It is certified that error appears in the above-identified patent and that said Letters Patent is hereby corrected as shown below:

In the Specification

Column 13, Lines 48-49: delete "historical action information 270" and insert --historical action information 260--

Column 13, Lines 54-55: delete "object statistical information 260" and insert --object statistical information 270--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*